United States Patent
Hurewitz et al.

(10) Patent No.: US 8,566,146 B1
(45) Date of Patent: Oct. 22, 2013

(54) COMPUTER-BASED SYSTEMS AND METHOD FOR COMPUTING A SCORE FOR CONTACTS OF A FINANCIAL SERVICES FIRM INDICATIVE OF RESOURCES TO BE DEPLOYED BY THE FINANCIAL SERVICES FIRM FOR THE CONTACTS TO MAXIMIZE REVENUE FOR THE FINANCIAL SERVICES FIRM

(75) Inventors: Barry S. Hurewitz, New York, NY (US); Scott Solomon, New York, NY (US); Thami Rachidi, Bayonne, NJ (US); Lauren Fleming, New York, NY (US); Omar Moustafa, Brooklyn, NY (US); Robert Treder, New York, NY (US); Vaughn S. Harvey, New York, NY (US)

(73) Assignee: Morgan Stanley & Co. LLC, New York, NY (US)

( * ) Notice: Subject to any disclaimer, the term of this patent is extended or adjusted under 35 U.S.C. 154(b) by 0 days.

(21) Appl. No.: 13/468,348

(22) Filed: May 10, 2012

(51) Int. Cl.
*G06Q 10/00* (2012.01)

(52) U.S. Cl.
USPC .................... 705/7.38; 705/7.39; 705/7.41

(58) Field of Classification Search
USPC ...................... 705/7.38, 7.39, 7.41
See application file for complete search history.

(56) References Cited

U.S. PATENT DOCUMENTS

| | | | | | |
|---|---|---|---|---|---|
| 5,535,256 | A | * | 7/1996 | Maloney et al. | 379/309 |
| 5,684,964 | A | * | 11/1997 | Powers et al. | 705/7.42 |
| 5,696,811 | A | * | 12/1997 | Maloney et al. | 379/265.07 |
| 5,726,914 | A | * | 3/1998 | Janovski et al. | 702/84 |
| 5,926,794 | A | * | 7/1999 | Fethe | 705/7.39 |
| 5,946,375 | A | * | 8/1999 | Pattison et al. | 379/112.01 |
| 6,119,097 | A | * | 9/2000 | Ibarra | 705/7.42 |
| 6,510,419 | B1 | * | 1/2003 | Gatto | 705/36 R |
| 6,604,084 | B1 | * | 8/2003 | Powers et al. | 705/7.41 |
| 6,661,882 | B1 | * | 12/2003 | Muir et al. | 379/127.01 |
| 6,681,211 | B1 | * | 1/2004 | Gatto | 705/36 R |
| 6,853,975 | B1 | * | 2/2005 | Dirksen et al. | 434/107 |
| 6,983,257 | B2 | * | 1/2006 | Gatto | 705/36 R |
| 7,010,495 | B1 | | 3/2006 | Samra et al. | |
| 7,149,716 | B2 | * | 12/2006 | Gatto | 705/36 R |
| 7,167,838 | B1 | * | 1/2007 | Gatto | 705/36 R |
| 7,266,508 | B1 | * | 9/2007 | Owen et al. | 705/7.13 |

(Continued)

FOREIGN PATENT DOCUMENTS

| | | |
|---|---|---|
| WO | WO 2007/038587 A2 | 4/2007 |
| WO | WO 2011/086547 A1 | 7/2011 |

OTHER PUBLICATIONS

Upshot.com Web pages—Upshot Sales product Upshot.com, Jul. 1998.*

(Continued)

*Primary Examiner* — Scott L Jarrett
(74) *Attorney, Agent, or Firm* — K&L Gates LLP (57) ABSTRACT

Computer-based systems and methods for computing a score (a "target score") for the contacts of a research department. The target score may be computed for each contact for each analyst team of the research department. The target score indicates how resources should be deployed by the research department to maximize revenue for the research department. The target score is computed based on a number of metrics. These metrics can include both analyst-team-specific contact metrics that relate to the contact-analyst team combination, as well as account metrics that pertain to the investment accounts associated with each of the contacts. Weights for the metrics may be determined using an optimization algorithm.

26 Claims, 2 Drawing Sheets

(56) References Cited

U.S. PATENT DOCUMENTS

| | | | |
|---|---|---|---|
| 7,509,277 B1 * | 3/2009 | Gatto | 705/36 R |
| 7,539,637 B2 * | 5/2009 | Gatto | 705/36 R |
| 7,546,263 B2 * | 6/2009 | Columbus et al. | 705/36 R |
| 7,636,680 B2 * | 12/2009 | Gatto | 705/36 R |
| 7,689,490 B2 | 3/2010 | Hurewitz | |
| 7,693,773 B2 | 4/2010 | Hockley et al. | |
| 7,734,517 B2 | 6/2010 | Hurewitz | |
| 7,752,103 B2 | 7/2010 | Hurewitz | |
| 7,752,112 B2 * | 7/2010 | Gatto et al. | 705/36 R |
| 7,769,654 B1 | 8/2010 | Hurewitz | |
| 7,783,547 B1 * | 8/2010 | Gorer | 705/36 R |
| 7,805,330 B2 | 9/2010 | Johnson et al. | |
| 7,822,648 B2 | 10/2010 | Petersen et al. | |
| 7,831,465 B2 * | 11/2010 | Hoff | 705/7.31 |
| 7,860,774 B1 * | 12/2010 | Peterson et al. | 705/36 R |
| 7,877,309 B2 * | 1/2011 | Gatto et al. | 705/36 R |
| 7,904,364 B2 | 3/2011 | Hurewitz | |
| 7,941,359 B2 * | 5/2011 | Tanner | 705/37 |
| 7,953,652 B1 | 5/2011 | Hurewitz | |
| 7,974,870 B2 * | 7/2011 | Ikezawa | 705/7.38 |
| 8,086,482 B2 * | 12/2011 | Silvera et al. | 705/7.38 |
| 8,095,414 B2 * | 1/2012 | Silvera et al. | 705/7.38 |
| 8,185,469 B2 * | 5/2012 | Tanner | 705/37 |
| 8,209,253 B2 * | 6/2012 | Hurewitz | 705/36 R |
| 8,214,238 B1 * | 7/2012 | Fairfield et al. | 705/7.11 |
| 8,300,797 B1 * | 10/2012 | Benesh et al. | 379/265.03 |
| 8,311,879 B2 * | 11/2012 | Alderman et al. | 705/7.36 |
| 8,311,923 B2 * | 11/2012 | Gatto et al. | 705/36 R |
| 2001/0056367 A1 * | 12/2001 | Herbert et al. | 705/11 |
| 2002/0002520 A1 * | 1/2002 | Gatto | 705/36 |
| 2002/0022988 A1 * | 2/2002 | Columbus et al. | 705/11 |
| 2002/0032629 A1 * | 3/2002 | Siegel et al. | 705/36 |
| 2002/0052820 A1 * | 5/2002 | Gatto | 705/36 |
| 2002/0138285 A1 | 9/2002 | DeCotiis et al. | |
| 2003/0028464 A1 * | 2/2003 | Kosinski | 705/36 |
| 2003/0167197 A1 * | 9/2003 | Shoemaker et al. | 705/10 |
| 2003/0204440 A1 * | 10/2003 | Koller et al. | 705/11 |
| 2004/0002893 A1 * | 1/2004 | Feher | 705/10 |
| 2005/0080695 A1 * | 4/2005 | Gatto | 705/35 |
| 2005/0108041 A1 * | 5/2005 | White | 705/1 |
| 2005/0234770 A1 | 10/2005 | McKnight et al. | |
| 2005/0267824 A1 * | 12/2005 | Hurewitz | 705/30 |
| 2006/0020509 A1 * | 1/2006 | Strain et al. | 705/14 |
| 2006/0074785 A1 * | 4/2006 | Festog et al. | 705/35 |
| 2006/0095431 A1 | 5/2006 | Nash | |
| 2006/0218074 A1 * | 9/2006 | Kohn | 705/37 |
| 2007/0282650 A1 * | 12/2007 | Jackness et al. | 705/7 |
| 2008/0154664 A1 * | 6/2008 | Kuo et al. | 705/7 |
| 2009/0006268 A1 * | 1/2009 | Tanner | 705/36 R |
| 2009/0171698 A1 * | 7/2009 | Suenderhauf et al. | 705/4 |
| 2009/0172518 A1 * | 7/2009 | Ogievetsky | 715/234 |
| 2009/0234846 A1 | 9/2009 | Nash | |
| 2009/0240574 A1 * | 9/2009 | Carpenter et al. | 705/11 |
| 2009/0319344 A1 * | 12/2009 | Tepper et al. | 705/11 |
| 2009/0327118 A1 | 12/2009 | Petersen et al. | |
| 2010/0145757 A1 * | 6/2010 | Hurewitz | 705/8 |
| 2010/0290603 A1 | 11/2010 | Gemayel et al. | |
| 2011/0047072 A1 | 2/2011 | Ciurea | |
| 2011/0087530 A1 | 4/2011 | Fordyce, III et al. | |
| 2011/0087531 A1 | 4/2011 | Fordyce, III et al. | |
| 2011/0093327 A1 | 4/2011 | Fordyce et al. | |
| 2011/0173076 A1 | 7/2011 | Eggleston et al. | |
| 2011/0231225 A1 | 9/2011 | Winters | |
| 2011/0231258 A1 | 9/2011 | Winters | |
| 2011/0264581 A1 | 10/2011 | Clyne | |
| 2011/0302036 A1 | 12/2011 | Fordyce, III et al. | |
| 2012/0059735 A1 | 3/2012 | Su et al. | |

OTHER PUBLICATIONS

SalesLogix.com Web pages SalesLogix, Apr. 2001, Retrieved from Archive.org Aug. 30, 2005.*

LeadTrack.com Web pages LeadTrack Software, Feb. 2001, Retrieved from Archive.org Nov. 5, 2007.*

McDonald, Malcolm et al., Key Account Management Butterworth-Heinemann, 1998.*

Alwang, Gret, Sell Smarter PCMag.com, Sep. 19, 2000.*

Baysan, Can et al., The Design and Development of a Sales Force Automation Tool Using Business Process Management Software, Proceedings of the 2005 Systems and Information Engineering Design Symposium, 2005.*

Hennessey, Hubert D., Software Propels The Selling Cycle Software Magazine, vol. 8, No. 8, Jun. 1988.*

Performance Appraisal and Development—User's Manual State of New Mexico, State Personnel Board, Jul. 2001.*

Pritchard, Robert D. et al.; Design a Goal-Setting System to Enhance Performance: A Practical Guide Organizational Dynamics, vol. 17, No. 1, Jun. 1988.*

Gautrea, Andrew et al., Recent trends in performance measurement systems—the balanced scorecard approach Management Research News, vol. 24, No. 3/4, 2001.*

Achieving Organizational Excellence Through the Performance Measurement System American Productivity & Quality Center, 1999.*

Grant, Rebecca A. et al., Computerized Performance Monitors as Multidimensional Systems: Derivation and Application ACM, Transactions on Information Systems, vol. 14, No. 2, Apr. 1996.*

Capillo, Joe, Sales Performance Accountability Furniture World, Jul. 1, 1998.*

R. Fletcher and C.M. Reeves, "Function Minimization by Conjugate Gradients," *Computer Journal*, 7, pp. 149-154, (1964) downloaded from http://comjnl.oxfordjournals.org/ on May 10, 2012.

S. Kirkpatrick et al., "Optimization by Simulated Annealing," *Science*, New Series, vol. 220, No. 4598. (May 13, 1983), pp. 671-680.

W.R. Mebane, Jr. and J.S. Sekhon, "Genetic Optimization Using Derivatives: The rgenoud Package for R." *Journal of Statistical Software*, May 2011, vol. 42, Issue 11 (26 pages).

* cited by examiner

FIG. 2

COMPUTER-BASED SYSTEMS AND METHOD FOR COMPUTING A SCORE FOR CONTACTS OF A FINANCIAL SERVICES FIRM INDICATIVE OF RESOURCES TO BE DEPLOYED BY THE FINANCIAL SERVICES FIRM FOR THE CONTACTS TO MAXIMIZE REVENUE FOR THE FINANCIAL SERVICES FIRM

BACKGROUND

In the securities research industry, so called "sell-side firms" provide, among other things, research regarding securities (such as stocks or bonds) to, among others, so-called "buy-side firms," which are typically institutional investors such as mutual funds, hedge funds, pension funds, etc. Particularly for equity research, sell-side firms typically employ a number of analyst teams that analyze and publish research reports about equity securities for publicly-traded companies in different industry sectors and/or geographic regions. For example, a sell-side firm may have a North America pharmaceuticals research team that analyzes North American publicly-traded pharmaceutical companies, a North America oil services research team that analyzes North American publicly-traded oil services companies, a North America semiconductors research team that analyzes publicly-traded companies that make and sell semiconductor products, and so on. The sell-side firm might also have corresponding European and/or Asian research analyst teams.

The analyst teams typically include a primary analyst and several research associates, though some teams may have other positions as well. These research teams generate numerous different types of research touch points for consumers of the research (e.g., the buy-side firms). The research touch points may include research reports (e.g., published electronic or hard copy reports), one-to-one telephone calls or meetings with contacts at the buy-side firms, tailored or blast emails and voicemails to such contacts, and/or other events such as seminars, conferences, corporate road shows, and meetings with corporate management.

A sell-side firm also typically employs salespeople who facilitate the distribution of the work product of the various research teams to appropriate contacts at the buy-side firms. The contacts typically are associated with one or more investment funds or accounts of the buy-side firm. A sell-side salesperson typically has contacts at many different buy-side firms, and those contacts may be interested in research work product from many different analyst teams at the sell-side firm. One role of a sell-side salesperson is to alert and distribute to his/her contacts work product from the various sell-side analyst teams.

Often equity research resources generated by the sell-side firm are provided to various buy-side firms and accounts without direct charge. Instead, buy-side firms compensate the sell-side firm for research by utilizing the brokerage services of the sell-side firm to execute trades. The price paid by the buy-side firm for trade execution is intended to compensate the sell-side firm for brokerage services as well as for any equity research resources consumed by the buy-side firm. Accordingly, buy-side firms typically direct their trade execution business to sell-side firms that provide valuable equity research. One common method utilized by buy-side firms is a broker vote. According to a typical broker vote process, a buy-side firm polls its research consumers (typically including contacts at the buy-side firm of the sell-side firm) to identify the sell-side film or firms that provide research valued by the research consumers. Research consumers may be any buy-side firm personnel who consume equity research, such as fund managers in the buy-side firm and/or their analyst teams. In some embodiments, broker votes may be limited to personnel that make trading decisions based on equity research. The buy-side firm then selects sell-side firms for execution services based on the results of the vote.

SUMMARY

In one general aspect, the present invention is directed to computer-based systems and methods for computing a score (a "target score") for the contacts of a research department, such as the equity (or other securities) research department of a sell-side firm. The target score may be computed for each contact for each analyst team of the research department. The target score indicates how resources should be deployed by the research department to maximize revenue for the research department. For example, a contact with a high target score for a particular analyst team can be targeted for events involving the analyst team (e.g., seminars, conference calls, etc.). The target score is computed based on a number of metrics having numerical values. These metrics can include both analyst-team-specific contact metrics that relate to the contact-analyst team combination, as well as account metrics that pertain to the investment accounts associated with each of the contacts. In various embodiments, to compute the target scores, first a set of weight for the metrics is determined using an optimization algorithm. The optimization algorithm preferably determines the weights—one for each metric—that maximizes revenue for each analyst team from the contacts per a unit time subject to one or more constraints. Once the set of weights is determined, the target score is computed based on at least (i) the values of metrics for each contact and (ii) the corresponding weights for the metrics. For example, the target score may be (or otherwise related to) the sum of the products of, for each contact, (i) the value of the each metric for the contact and (ii) the associated weight for the metric.

DESCRIPTION OF THE FIGURES

Various embodiments of the present invention are described herein by way of example in conjunction with the following figures, wherein.

DESCRIPTION

Embodiments of the present invention are described herein in the context of a sell-side equity research department that provides research work product to contacts at buy-side firms, where the equity research department comprises, among other things, multiple analyst teams that cover different industry sectors and/or geographic regions, and salespeople at the sell-side firms that have contacts at the buy-side firms/accounts. It should be noted that the analyst teams preferably also have contacts at the buy-side firms. In addition, different salespeople and/or analyst teams may have one or more common contacts at a buy-side firm. The collective contacts of the various salespeople and analyst teams of the equity research department are sometimes referred to herein as the "contacts" of the equity research department.

Figure 1:
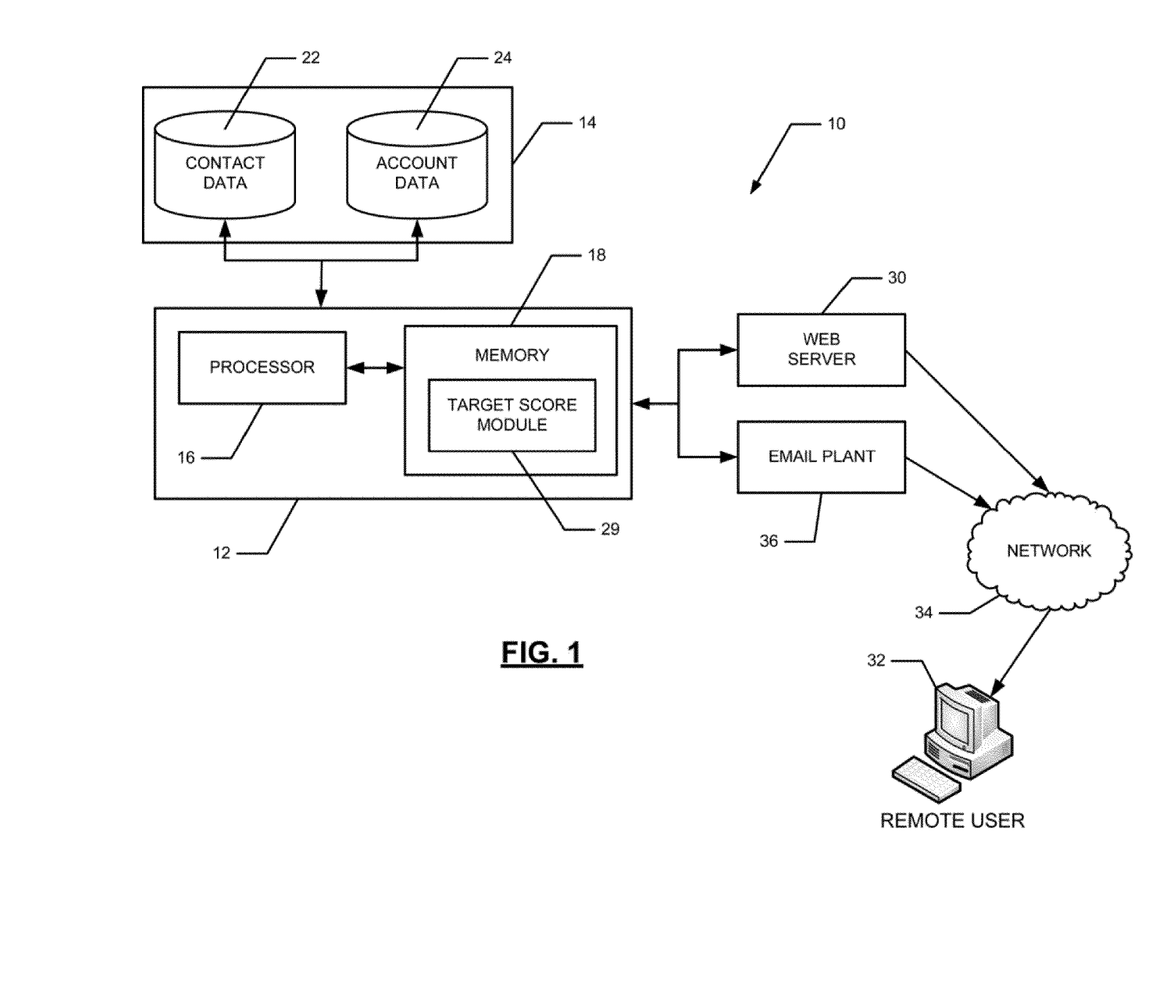
FIG. 1 is a diagram of a computer system according to various embodiments of the present invention.

FIG. 1 is a diagram of a computer-based system 10 according to various embodiments of the present invention that computes a score (referred to herein as a "target score") for each of the contacts for each analyst team (e.g., a score $C_{ij}$ for each contact i for each analyst team j) that is indicative of how the resources of the research department should be employed with respect to the contacts to maximize revenue for the research department. The computer-based system 10 may comprise one or more networked, electronic computer devices 12, such as servers, personal computers, workstations, mainframes, laptops, and/or handheld computing devices. As shown in FIG. 1, the system 10 may comprise a computer-based data storage system 14, one or more processor circuits 16, and one or more memory units 18. For convenience, only one processor circuit (referred to hereinafter simply as "processor") 16 and one memory unit 18 are shown in FIG. 1, although it should be recognized that the computer system 10 may comprise multiple processors 16 and/or multiple memory units 18. The memory 18 may store a number of software modules, such as target score module 20 as shown in FIG. 1. The target score module 20 may comprise software code that is executed by the processor 16, which execution causes the processor 14 to compute the target score for each contact for each analyst team. The memory 18 may comprise primary computer memory, such as a read only memory (ROM) and/or a random access memory (e.g., a RAM). The memory could also comprise secondary computer memory, such as magnetic or optical disk drives or flash memory, for example.

The data storage system 14 may comprise a number of data stores, which may be implemented as computer databases, data files, directories, or any other suitable system for storing data for use by computers. The data storage system 14 may be embodied as solid state memory (e.g., ROM), hard disk drive systems, RAID, disk arrays, storage area networks (SANs), and/or any other suitable system for storing computer data. In addition, the data storage system 14 may comprise caches, including web caches and database caches. The data storage system 14 may be part of the computer device(s) 12 or connected to the computer device(s) 12 via a network connection.

The data stores may comprise a contact data store 22 and an account data store 24. The contact data store 22 may store data about the research department contacts that are used to compute the target scores. For example, the contact data store 22 may store values for each contact for a number of contact-related metrics that are used to compute the target score. Each contact may be associated with an investment account (e.g., a "buy-side firm"). The account data store 24 may store data about the accounts that are also used to compute the target scores. For example, the account data store 24 may store values for each account a number of account-related metrics that are used to compute the target score. The data for computing these metrics may be stored in the contact data store 22 and/or account data store 24, or some other data store of the computer system 10.

The contact metrics may comprise a number of analyst-team-specific contact metrics, i.e., metrics for the contact that are specific to the analyst team. For example, the following analyst-team-specific metrics may be used: (i) a contact revenue metric; (ii) a contact priority metric; and (iii) an account revenue per contact minute (or some other unit of time) metric. The contact revenue metric may be, for each contact-analyst team combination, the revenue of the analyst team from the account of the contact over a time period (e.g., the prior six months or some other time period) that is allocated to the contact. The revenue of the analyst team from the account may be determined based on the trade execution revenue from the account. It may be allocated to the individual analyst teams of the research department based on the broker votes of the account and/or the interaction of the account's contacts with the individual analyst teams. The proportion of the revenue of the account for an analyst team may be allocated to a contact associated with the account based on, for example, the contact's broker votes (if any) for the analyst team, the contact's interactions with the analyst team, and/or the contact's readership of research work product produced by the analyst team. For example, if there were any broker votes for the analyst team from the account, the revenue of a particular contact at the account that is allocated to the contact for the analyst team may be computed as, or otherwise related to, the product of (i) the analyst team revenue from the account and (ii) the proportion of the contact's broker votes for the analyst team to the account's broker votes for the analyst team across all contacts at the account. If there are no broker votes for the analyst team for the account, the revenue of a particular contact at the account that is allocated to the contact for the analyst team may be computed as, or otherwise related to, the product of (i) the analyst team revenue from the account and (ii) the proportion of the contact's compensation-weighted interaction minutes (or other time unit) for the analyst team to the account's total compensation-weighted interaction minutes across all contacts at the account. In addition to or in lieu of interaction minutes, the proportion of the contact's emails to the analyst team relative to all emails from contacts of the account to the analyst team may be used to allocate account revenue to a contact. Additionally, the account revenue can be allocated to the contact based on the proportion of the contact's reads of the analyst team relative to all of the reads by all of the contacts of the account for the analyst team. The proportion of reads may be used in conjunction with the interaction duration and/or emails, or it can be used when there are no interactions, for example.

The contact priority metric may be based on priority level of the contact for the analyst team. The priority level of the contact for the analyst team may be determined as described in U.S. provisional patent application Ser. No. 61/480,911, entitled "Computer-Based Systems and Methods for Identifying Priority Contacts and Enthusiasts of a Research Department," filed Apr. 29, 2011, which is incorporated herein by reference in its entirety. The priority values could be a first value (e.g., 0) for a contact that is not a priority and a second value (e.g., 1) for a contact that is a priority. In other embodiments, continuous priority values (or additional discrete values) could be used to provide more detailed valuations of priority level for the contacts.

The account revenue per contact minute metric for a particular contact for an analyst team may be computed as, for example, the ratio of (i) the account revenue for the contact's account for the analyst team over some time period (such as the prior six months) and (ii) the total interaction duration of the contact with the analyst team over the same time period.

The account metrics may comprise, for example, (i) an account tier metric indicative of the account's tier with the research department, (ii) an account revenue metric indicative of the revenue over a time period (e.g., the prior six months) from the contact's account, (iii) an account-analyst team revenue metric indicative of the revenue from the account allocated to the particular analyst team (see above for a description of how determined), (iv) an account revenue per time unit metric for an analyst team indicative of the rate of revenue from an account allocated to a particular analyst team, and (v) an account elasticity metric for the account. The value of the account revenue per time unit metric for an account for an analyst team may be determined based on the revenue of the account for the analyst team divided by the cumulative interaction duration of all of the account's contacts with the analyst team. The value of the elasticity metric of the account may be determined, for example, as described in U.S. provisional patent application Ser. No. 61/527,971, entitled "Computer-Based Systems and Methods for Computing Market-Adjusted Elasticities for Accounts," filed Aug. 26, 2011, which is incorporated herein by reference.

Figure 2:
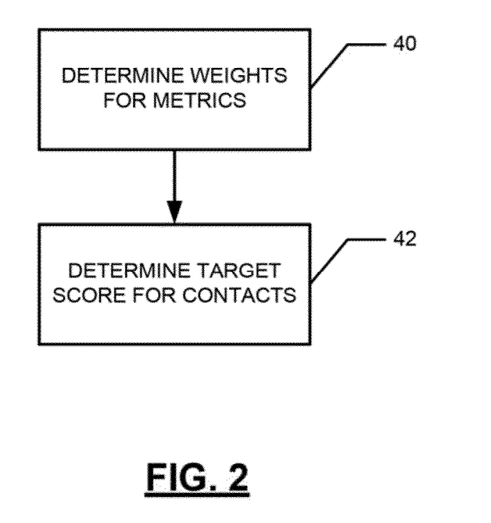
FIG. 2 is a diagram of a process flow of the computer system for computing the target score according to various embodiments of the present invention

In various embodiments, the target score $C_{ij}$ for a contact i for the an analyst team j is (or otherwise related to) the weighted sum of various contact and account metrics. That is, for example, if N metrics in are used, the target score is $$C_{ij} = \sum_{k=1}^{N} w_k m_{k,ij},$$

where $m_{k,ij}$ is the value of the kth metric for the contact i for analyst team j, and $w_k$ is the weight for the kth metric. FIG. 2 is a diagram of a process flow performed by the processor 16 when executing the code of the target score module 20 to compute the target scores for the contacts according to various embodiments. At block 40, the weights $w_k$ are determined and, at block 42, the target scores for the contacts are computed using the weights $w_k$ determined at step 40.

In various embodiments, an optimization algorithm may be used to determine the set of weights $w_k$ used to compute the target scores. Each possible set of weights for the metrics translates to a target score for each contact at the analyst team level, where the target score is indicative of the revenue per time period (e.g., minute) of the contact for the analyst team. The optimization algorithm determines the set of weights that maximizes the revenue of the research department by maximizing the sum of the revenue of each contact for each analyst team per unit time (e.g., a minute of some other time unit), subject to one or more constraints. In various embodiments, a heuristic optimization algorithm or a probabilistic optimization algorithm may be used. Suitable optimization algorithms for optimizing the weights include:

- the simulated annealing (SA) algorithm, for which further details can be found in Kirkpatrick, S., Gelatt, C. D., and M. P. Vecchi, "*Optimization by Simulated Annealing*", Science, Vol. 220, Nbr. 4598, May 13, 1983, which is incorporated herein by reference in its entirety;
- the conjugate gradient (CG) algorithm, for which further details can be found in (i) Fletcher, R. and Reeves, C. M., "*Function minimization by conjugate gradients*", Computer Journal, 7, 148-154, 1964 and (ii) Chong, E., and Zak, S., "An Introduction to Optimization", Wiley-Interscience, 2d ed., 2001, both which are incorporated herein by reference in their entirety;
- the Quasi-Newton (QN) algorithm, for which further details can be found in Chong, E., and Zak, S., "An Introduction to Optimization", Wiley-Interscience, 2d ed., 2001;
- the Nelder and Mead (NM) algorithm, for which further details can be found in Nelder, J. A. and Mead, R., "*A simplex algorithm for function minimization*", Computer Journal, 7, 308-313 1965, which is incorporated herein by reference in its entirety; and
- the genetic algorithm (GA), for which further details can be found in Mebane, W. R. and Sekhon, S, S, "Genetic Optimization Using Derivatives: The rgenoud Package for R," Journal of Statistical Software, Vol. 42, Issue 11, May 2011, which is incorporated herein by reference in its entirety. In various embodiments, one or more of these algorithms may be used. Where more than one is used, the algorithm that produces the set of weights that maximizes revenue is used to compute the target scores at block 42.

To determine the weights using the optimization algorithm, one or more constraints are used. For example, one constraint may be that an analyst team can interact only with up to a maximum number of contacts per day, such as 20, 30, 40 or some other suitable and appropriate maximum. Another constraint may be that a contact can interact only with up to a maximum number of analyst teams per day, such as 3 to 5 or some other suitable number. In some embodiments, both constraints may be used. Also, each analyst team in the research department could have the a same maximum number of contacts per day, or in other embodiments different analyst teams could have a different maximum number of contacts per day in order to better capture the capabilities of the different teams for interacting with contacts. In other embodiments, different and/or additional constraints may be used. For example, there could be limits on account revenue and/or account revenue growth in various embodiments.

Once the weights are determined at block 40 using the optimization algorithm, the target score $C_{ij}$ for each contact i for each analyst team j may be computed at block 42 as $$C_{ij} = \sum_{k=1}^{N} w_k m_{k,ij},$$

where $m_{k,ij}$ is the value of the kth metric for contact i for analyst team j, and $w_k$ is the weight for the kth metric. As mentioned above, the metrics that are used to compute the target scores may be:
- the account tier metric;
- the account revenue metric;
- the account-analyst team revenue metric;
- the account revenue per time unit metric;
- the account elasticity metric;
- the contact revenue metric;
- the contact priority metric; and
- the account revenue per contact minute metric.

In various embodiments, if these metrics are used, the target score $C_{ij}$ for each contact i for each analyst team j would be the sum of the products of, for each metric, the contact's value for the metric and the corresponding weight, e.g.:

$C_{ij}$=(w1×Tier)+(w2×Account Revenue)+(w3×Account-analyst team revenue)+(w4×account revenue per time unit)+(w5×account elasticity)+ (w6×contact revenue)+(w7×contact priority)+ (w8×account revenue per contact minute)

In various embodiments, steps 40 and 42 may be performed with the same frequency, or they could be performed with different frequencies. For example, the weights may be determined (step 40) quarterly and the target scores may be computed (step 42) every two weeks. Also, the step of determining the weights can be computationally expensive, especially if multiple optimization algorithms are used to determine the weights. In various embodiments, a distributed and parallel computing system 10 may be used to determine the weights more quickly. In addition, where more than one constraint is used, to reduce computational expense the optimization algorithm may first be run with just one or some other subset of the constraints. From these "first-pass" sets of weights that satisfy this single constraint (or subset of constraints), the final set of weights may be chosen by determining which of the "first-pass" sets of weights satisfy the other constraints.

In other embodiments, team-specific weights could be used that is, each analyst team could have its own set of weights (or groups of analyst teams could have a different set of weights than another group of analyst teams). One way to do this is to search for the weights that maximize revenue for the research department by maximizing the contact-analyst team revenue per time unit, as described above. Another, less computationally expensive approach is to maximize the contact-analyst team revenue per unit time within each analyst team. In such an approach, the optimization algorithm can be run one analyst team at a time. In such an approach, however, constraints on the analyst teams alone (such as number of different analyst teams that a contact can interact with in a day or account revenue) cannot be used.

The target scores can be used, for example, to help the research department deploy its resources to maximize revenue. The research department can provide (or at least assess whether to provide) more service to contacts with greater target scores. For example, the research department could include or invite contacts with high target scores for a particular analyst team to events involving the analyst team, such as conference calls, conferences, etc.

While embodiments and aspects of the present invention are described herein in the context of a sell-side equity research department, it should be noted that the embodiments and aspects of the present invention are not necessarily limited to sell-side equity research departments unless specifically noted, and that embodiments or aspects of the present invention described herein may be applicable to industries other than sell-side equity research departments, such as fixed-income research departments, other types of research departments that produce research work product that is consumed by clients or customers of the research department, or applicable to any organization or enterprise with customers, clients or contacts, for example.

Referring back to FIG. 1, the computer system 10 may also include one or more web servers 30 in communication with the computer 12. The web server(s) 30 may host web sites accessible by a remote user 32, via an electronic data communication network 34. The network 34 may comprise one or more LANs, WANs, the Internet, and/or an extranet, or any other suitable data communication network allowing communication between computer systems. The network 34 may comprise wired and/or wireless links. The computer system 10 may also comprise a computer-based email plant 36. The computer-based email plant 36 may be implemented as one or more computer servers that handle the email protocol for the organization or enterprise associated with the computer system 10. The email plant 36 may facilitate the sending and receiving of internal and external emails via the computer data network 34.b For example, the web server(s) 30 may host a web site, accessible by the remote user 32, that serves the target scores for the contacts of the research department, and the email plant 36 may mail the target scores to the remote user 32.

Additional details related to the present invention may be found in:

U.S. provisional patent application Ser. No. 61/540,695, filed Sep. 29, 2011, entitled "Computer-Based Systems and Methods for Determining Interest Profiles for Contacts of a Research Department and for Computing Contact Interest Levels in Research Work Product Produced by the Research Department;" and U.S. non-provisional patent application Ser. No. 13/402,998, filed Feb. 23, 2012, entitled "Computer-Based Systems and Methods for Determining Interest Levels of Consumers in Research Work Product Produced by a Research Department," both of which are hereby incorporated herein by reference in their entirety.

In various embodiments, the present invention is directed to computer-implemented systems and methods for computing a score for a plurality of contacts of a research department indicative of resources to be deployed by the research department for the contacts to maximize revenue for the research department, where the research department comprises a plurality of analyst teams that produce research and the plurality of contacts comprise consumers of the research. The method comprise the steps of: (i) storing by a computer system for each contact values for a plurality of metrics; (ii) determining by the computer system by using an optimization algorithm weights for each of the plurality of metrics that maximizes revenue for each analyst team from the contacts per a unit time subject to one or more constraints; and (iii) computing by the computer system the score for each contact for each analyst team based on at least (a) the values for the plurality of metrics for each contact and (b) the weights. Computing the target scores for each contact for each analyst team may comprises: (i) computing a product for each of the plurality of metrics by multiplying (a) the weight for each of the plurality of metrics by (b) the value for the metric of the contact for the analyst team; and (ii) summing the plurality of products. The optimization algorithm may comprise a heuristic optimization algorithm or a probabilistic optimization algorithm.

The one or more constraints may comprise (i) a first constraint that each analyst team interacts with a maximum number of contacts per the unit time; and (ii) a second constraint that each contact interacts with a maximum number of analyst teams per the unit time. In addition, since each contact is associated with an investment account, a third constraint that limits revenue from the investment accounts of the plurality of contacts may be used. The weights may be the same for each analyst team, but in other embodiments different analyst teams could have different weights such that a first analyst team has a first set of weights and a second analyst team has a second set of weights.

The computer system may comprise: (i) a computer data storage system for storing for each contact values for a plurality of metrics; and (ii) at least one processor in communication with the compute data storage system. The at least one processor may be programmed to: (i) determine by using an optimization algorithm weights for each of the plurality of metrics that maximizes revenue for each analyst team from the contacts per a unit time subject to one or more constraints; and (ii) compute the score for each contact for each analyst team based on at least (a) the values for the plurality of metrics for each contact and (b) the weights.

It will be apparent to one of ordinary skill in the art that at least some of the embodiments described herein may be implemented in many different embodiments of software, firmware, and/or hardware. The software and firmware code may be executed by a processor circuit or any other similar computing device. The software code or specialized control hardware that may be used to implement embodiments is not limiting. For example, embodiments described herein may be implemented in computer software using any suitable computer software language type, using, for example, conventional or object-oriented techniques. Such software may be stored on any type of suitable computer-readable medium or media, such as, for example, a magnetic or optical storage medium. The operation and behavior of the embodiments may be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes associated with the present embodiments may be executed by programmable equipment, such as computers or computer systems and/or processors. Software that may cause programmable equipment to execute processes may be stored in any storage device, such as, for example, a computer system (nonvolatile) memory, an optical disk, magnetic tape, or magnetic disk. Furthermore, at least some of the processes may be programmed when the computer system is manufactured or stored on various types of computer-readable media.

It can also be appreciated that certain process aspects described herein may be performed using instructions stored on a computer-readable medium or media that direct a computer system to perform the process steps. A computer-readable medium may include, for example, memory devices such as diskettes, compact discs (CDs), digital versatile discs (DVDs), optical disk drives, or hard disk drives. A computer-readable medium may also include memory storage that is physical, virtual, permanent, temporary, semipermanent, and/or semitemporary.

A "computer," "computer system," "host," "server," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software modules used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable media.

In various embodiments disclosed herein, a single component may be replaced by multiple components and multiple components may be replaced by a single component to perform a given function or functions. Except where such substitution would not be operative, such substitution is within the intended scope of the embodiments. Any servers described herein, for example, may be replaced by a "server farm" or other grouping of networked servers (such as server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand and/or providing backup contingency in the event of component failure or reduction in operability.

The computer systems may comprise one or more processors in communication with memory (e.g., RAM or ROM) via one or more data buses. The data buses may carry electrical signals between the processor(s) and the memory. The processor and the memory may comprise electrical circuits that conduct electrical current. Charge states of various components of the circuits, such as solid state transistors of the processor(s) and/or memory circuit(s), may change during operation of the circuits.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein

What is claimed is:

1. A computer-implemented method for computing a target score for one or more contacts of a financial services firm indicative of resources to be deployed by the financial services firm for the contacts to maximize revenue for the financial services firm, wherein the financial services firm comprises a plurality of employee teams that produce research pertaining to at least one of financial instruments, industries and geographic regions, wherein each of the one or more contacts is associated with an account for holding and trading financial instruments, and wherein the one or more contacts comprise consumers of the research, the method comprising:

determining, by a computer system, for the one or more contacts, a value for each of a plurality of metrics that are used to compute the target scores for the contacts, wherein the plurality of metrics comprise, for each of the one or more contacts, at least:

a contact-employee team revenue metric that, for each of the one or more employee teams, is related to revenue of the employee team from the account associated with the contact over a prior time period that is allocated to the contact, wherein:

revenue from the contact's account is based on trade execution revenue of the financial services firm for the account;

revenue of the financial services firm from the contact's account is allocated to the one or more employee teams based on at least service provided by the employee teams to the account associated with the contact; and revenue of the financial services firm from the contact's account allocated to the one or more employee teams is allocated to the contact based on at least service provided to the contact by the one or more employee teams; and for the one or more employee teams, a contact revenue per unit time metric that is related to a ratio of (i) the revenue for the employee team from the contact's account that is allocated to the contact, to (ii) the time duration of the interactions by the contact with employees of the financial services firm over a prior time period; and at least one or more of the following metrics for each of the one or more contacts:

a contact priority metric for each employee team, indicative of whether the contact is priority for the employee team; and an account tier metric indicative of a service tier for the account associated with the contact;

storing the values for the plurality of metrics in a computer data storage system of the computer system;

determining, by the computer system, by using an optimization algorithm, weights for each of the plurality of metrics that maximizes revenue of the financial services firm by maximizing a sum of the revenue for each employee team from each of the one or more contacts per a unit time subject to one or more constraints; and computing by the computer system the target score for each of the one or more contacts for each employee team based on at least (i) the values for each of the plurality of metrics for each of the one or more contacts stored in the computer data storage system and (ii) the weights, wherein:

contacts with greater target scores are targeted for more service from the financial services firm; and the one or more constraints for the optimization algorithm comprise at least one constraint on availability for interactions between the employees and the contacts.

2. The method of claim 1, wherein computing the target score for one contact for one employee team comprises:

computing a product for each of the plurality of metrics by multiplying (i) the weight for each of the plurality of metrics by (ii) the value for the metric of the contact for the employee team; and summing the plurality of products.

3. The method of claim 1, wherein determining the weights comprises determining the weights using a heuristic optimization algorithm.

4. The method of claim 1, wherein determining the weights comprises determining the weights using a probabilistic optimization algorithm.

5. The method of claim 1, wherein the one or more constraints comprises a constraint that each employee team interacts with a maximum number of contacts per the unit time.

6. The method of claim 1, wherein the one or more constraints comprises a constraint that each contact interacts with a maximum number of employee teams per the unit time.

7. The method of claim 1, wherein the one or more constraints comprises:

a first constraint that each employee team interacts with a maximum number of contacts per the unit time; and a second constraint that each contact interacts with a maximum number of employee teams per the unit time.

8. The method of claim 7, wherein:

the one or more constraints comprises a third constraint that limits revenue from the accounts of the one or more contacts.

9. The method of claim 1, wherein the weights are the same for each employee team.

10. The method of claim 1, wherein a first employee team has a first set of weights and a second employee team has a second set of weights.

11. The method of claim 1, wherein the plurality of metrics further comprise an account elasticity metric for the account associated with each contact.

12. The method of claim 1, wherein the plurality of metrics comprise both the contact-employee team revenue metric and the a contact revenue per unit time metric for the one or more employee teams.

13. The method of claim 12, wherein the plurality of metrics comprise further comprise both the contact priority metric and the account tier metric.

14. A computer system for computing a target score for one or more contacts of a financial services firm indicative of resources to be deployed by the financial services firm for the contacts to maximize revenue for the financial services firm, wherein the financial services firm comprises a plurality of employee teams that produce research pertaining to at least one of financial instruments, industries and geographic regions, wherein each of the one or more contacts is associated with an account for holding and trading financial instruments, and wherein the one or more contacts comprise consumers of the research, the computer system comprising:

a computer data storage system; and at least one processor in communication with the compute data storage system, wherein the at least one processor is programmed to:

determine, for the one or more contacts, a value for each of a plurality of metrics that are used to compute the target scores for the contacts, wherein the value for the plurality of metrics are stored in the computer data storage, and wherein the plurality of metrics comprise, for each of the one or more contacts, at least:

a contact-employee team revenue metric that, for each of the one or more employee teams, is related to revenue of the employee team from the account associated with the contact over a prior time period that is allocated to the contact, wherein:

revenue from the contact's account is based on trade execution revenue of the organization for the account;

revenue of the organization from the contact's account is allocated to the one or more employee teams based on at least service provided by the employee teams to the account associated with the contact; and revenue of the organization from the contact's account allocated to the one or more employee teams is allocated to the contact based on at least service provided to the contact by the one or more employee teams; and for the one or more employee teams, a contact revenue per unit time metric that is related to a ratio of (i) the revenue for the employee team from the contact's account that is allocated to the contact, to (ii) the time duration of the interactions by the contact with employees of the organization over a prior time period; and at least one or more of the following metrics for each of the one or more contacts:

a contact priority metric for each employee team, indicative of whether the contact is priority for the employee team; and an account tier metric indicative of a service tier for the account associated with the contact;

determine, by using an optimization algorithm, weights for each of the plurality of metrics that maximizes revenue of the financial services by maximizing a sum of the revenue for each employee team from the one or more contacts per a unit time subject to one or more constraints; and compute the target score for each of the one or more contacts for each employee team based on at least (i) the values for the plurality of metrics for each of the one or more contacts stored in the computer data storage system and (ii) the weights, wherein:

contacts with greater target scores are targeted for more service from the organization; and the one or more constraints for the optimization algorithm comprise at least one constraint on availability for interactions between the employees and the contacts.

15. The computer system of claim 1, wherein the at least one processor is programmed to compute the target score for one contact for one employee team by:

computing a product for each of the plurality of metrics by multiplying (i) the weight for each of the plurality of metrics by (ii) the value for the metric of the contact for the employee team; and summing the plurality of products.

16. The computer system of claim 14, wherein a heuristic optimization algorithm is used to determine the weights.

17. The computer system of claim 14, wherein a probabilistic optimization algorithm is used to determine the weights.

18. The computer system of claim 14, wherein the one or more constraints comprises a constraint that each employee team interacts with a maximum number of contacts per the unit time.

19. The computer system of claim 14, wherein the one or more constraints comprises a constraint that each contact interacts with a maximum number of employee teams per the unit time.

20. The computer system of claim 14, wherein the one or more constraints comprises:
 a first constraint that each employee team interacts with a maximum number of contacts per the unit time; and
 a second constraint that each contact interacts with a maximum number of employee teams per the unit time.

21. The computer system of claim 20, wherein:
 the one or more constraints comprises a third constraint that limits revenue from the accounts of the one or more contacts.

22. The computer system of claim 14, wherein the weights are the same for each employee team.

23. The computer system of claim 14, wherein a first employee team has a first set of weights and a second employee team has a second set of weights.

24. The computer system of claim 14, wherein the plurality of metrics further comprise
 an account elasticity metric for the account associated with each contact.

25. The computer system of claim 14, wherein the plurality of metrics comprise both the contact-employee team revenue metric and the contact revenue per unit time metric for the one or more employee teams.

26. The computer system of claim 25, wherein the plurality of metrics comprise further comprise both the contact priority metric and the account tier metric.

\* \* \* \* \*